United States Patent [19]
Yokota et al.

[11] Patent Number: 5,321,846
[45] Date of Patent: Jun. 14, 1994

[54] SIGNAL TRANSMISSION SYSTEM WITH QUICKER RESPONSE AND WITH PARALLEL AND SERIAL OUTPUTS

[75] Inventors: Tetpei Yokota, Chiba; Yoshihiro Machiguchi, Tokyo, both of Japan

[73] Assignee: Sony Corporation, Japan

[21] Appl. No.: 687,749

[22] Filed: Apr. 19, 1991

[30] Foreign Application Priority Data

Apr. 28, 1990 [JP] Japan .................................. 2-113268
Jun. 1, 1990 [JP] Japan .................................. 2-144888

[51] Int. Cl.$^5$ ............................................. H04H 1/00
[52] U.S. Cl. ..................................... 455/4.2; 455/6.3
[58] Field of Search ............... 455/3.1, 3.2, 3.3, 4.1, 455/4.2, 5.1, 6.3; 358/86

[56] References Cited

U.S. PATENT DOCUMENTS

| | | | |
|---|---|---|---|
| 4,381,522 | 4/1983 | Lambert | 455/4.2 |
| 4,408,345 | 10/1983 | Yashiro et al. | 455/4.1 |
| 4,769,833 | 9/1988 | Farleigh et al. | 358/86 |
| 4,885,803 | 12/1989 | Hermann et al. | 455/4.1 |
| 4,897,714 | 1/1990 | Ichise et al. | 455/5.1 |
| 4,961,211 | 10/1990 | Tsugane et al. | 455/5.1 |

FOREIGN PATENT DOCUMENTS

04555492 11/1991 European Pat. Off. .
2226890 10/1990 Japan .
2191643 12/1987 United Kingdom .

OTHER PUBLICATIONS

European Search Report Cable, Television, and the Consumer Electronic, J. Hoffman.
English Abstract of 2-226890.

*Primary Examiner*—Reinhard J. Eisenzopf
*Assistant Examiner*—Nguyen Vo
*Attorney, Agent, or Firm*—Ronald P. Kananen

[57] ABSTRACT

A signal transmission system includes concentratedly arranged various kinds of electronic apparatus capable of transmitting information such as audio and/or video, and so forth. The system is provided with a main controller for controlling those apparatus and an auxiliary controller arranged in a plurality of chambers via cables so that information can be properly watched and heard through the above main controller. The system processes the transmission of information in a short time and also provides possibility of controlling even an electronic apparatus having no means for receiving control signals through wire by having the signals outputted in parallel or in series control signals for demanding transmission of information properly are fed to the various kinds of electronic apparatus from the auxiliary controller through the main controller.

7 Claims, 7 Drawing Sheets

SIGNAL TRANSMISSION SYSTEM WITH QUICKER RESPONSE AND WITH PARALLEL AND SERIAL OUTPUTS

BACKGROUND OF THE INVENTION

1. Field of the Invention

The present invention generally relates to a control system for a plurality of electronic apparatus, such as a home bus system and, more particularly, is directed to a signal transmission system.

2. Description of the Prior Art

In recent years, a home bus system has been practically used in homes. This home bus system connects various different electronic apparatus such as, for example, a personal computer, illumination control terminals, gas leakage sensor, and so on, by a transmission cable and makes various controls on the apparatus. In addition, the assignee of the present application has previously proposed the Multi Link System (hereinafter simply referred to as an MLS) in which audio and video informations are distributed through wires from one room of a home to each room where the information can be selectively viewed and listened to. Japanese Patent Laid-Open Gazette No. 2-226890 describes this previously-proposed MLS which will be described below.

Of a plurality of rooms of a house, a basement or a parlor, for example, is used as a master room. Within this master room, a plurality of electronic apparatus, for example, a CD (compact disc) player, a tape cassette deck, a VTR (video tape recorder) or the like, a multi-link center such as a multi-preamplifier or the like to which the electronic apparatus are connected and which controls the same are concentratedly installed. Whereas, multi-link receivers are installed in other rooms through cables in order that audio information and video information from the above-mentioned plurality of electronic apparatus can be listened to and viewed by means of remote controllers. Thus, by operating the remote controller provided in each of the multi-link receivers, it is possible for the user to view and listen to desired informations in each room from various electronic apparatus connected to the multi-link center in the master room.

In the above MLS, when the multi-link center receives control signals from remote controllers from respective rooms substantially at the same time in order for the users in different rooms to listen to and view audio and video informations from a predetermined electronic apparatus installed in the master room, the multi-link center arranges these control signals and transmits in a serial fashion a CD control signal, a tape cassette deck control signal, a VTR control signal, . . . to various electronic apparatus in that order by means of wires. Therefore, in order to process one command (control signal), 100 ms of time is required, and if n users operate their remote controllers within n rooms at a time, respectively, then they can view and listen to audio and video informations 100×n ms after the transmission of the commands. Thus, the users are kept waiting for a considerably long period of time.

Furthermore, because an electronic apparatus having no input terminal to receive a control signal through wires cannot receive the control signal from the multi-link center, such kind of electronic apparatus cannot be controlled from each room in a remote-control fashion.

OBJECTS AND SUMMARY OF THE INVENTION

Accordingly, it is an object of the present invention to provide an improved signal transmission system in which the aforenoted shortcomings and disadvantages encountered with the prior art can be substantially eliminated.

More specifically, it is an object of the present invention to provide a signal transmission system in which time for processing control signals from remote controllers in respective rooms by a multi-link center can be reduced considerably.

Another object of the present invention is to provide a signal transmission system in which a multi-link system can be constructed even when electronic apparatus having no wire connection input terminals are installed within a master room.

As an aspect of the present invention, a signal transmission system is comprised of main control means in which various kinds of electronic apparatus capable of transmitting information such as audio, video, and so forth, are concentratedly installed and controlling those various electronic apparatus and sub-control means installed in a plurality of rooms via cables so as to properly view and listen to the above information via the main control means. When a control signal for controlling the electronic apparatus is supplied to the main control means from the sub-control means, the main control means converts the input control signal to a control signal associated with each of the electronic apparatus and supplies control signals associated with various kinds of electronic apparatus in parallel or in series to various kinds of electronic apparatus.

The above, and other objects, features and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Referring to the drawings in detail, and initially to FIG. 1, the MLS (multi-link system) of the present invention will be described hereinafter. In this case, FIG. 1 is formed of FIGS. 1A and 1B drawn on two sheets of drawings so as to permit the use of a suitably large scale.

Figures 1, 1A:
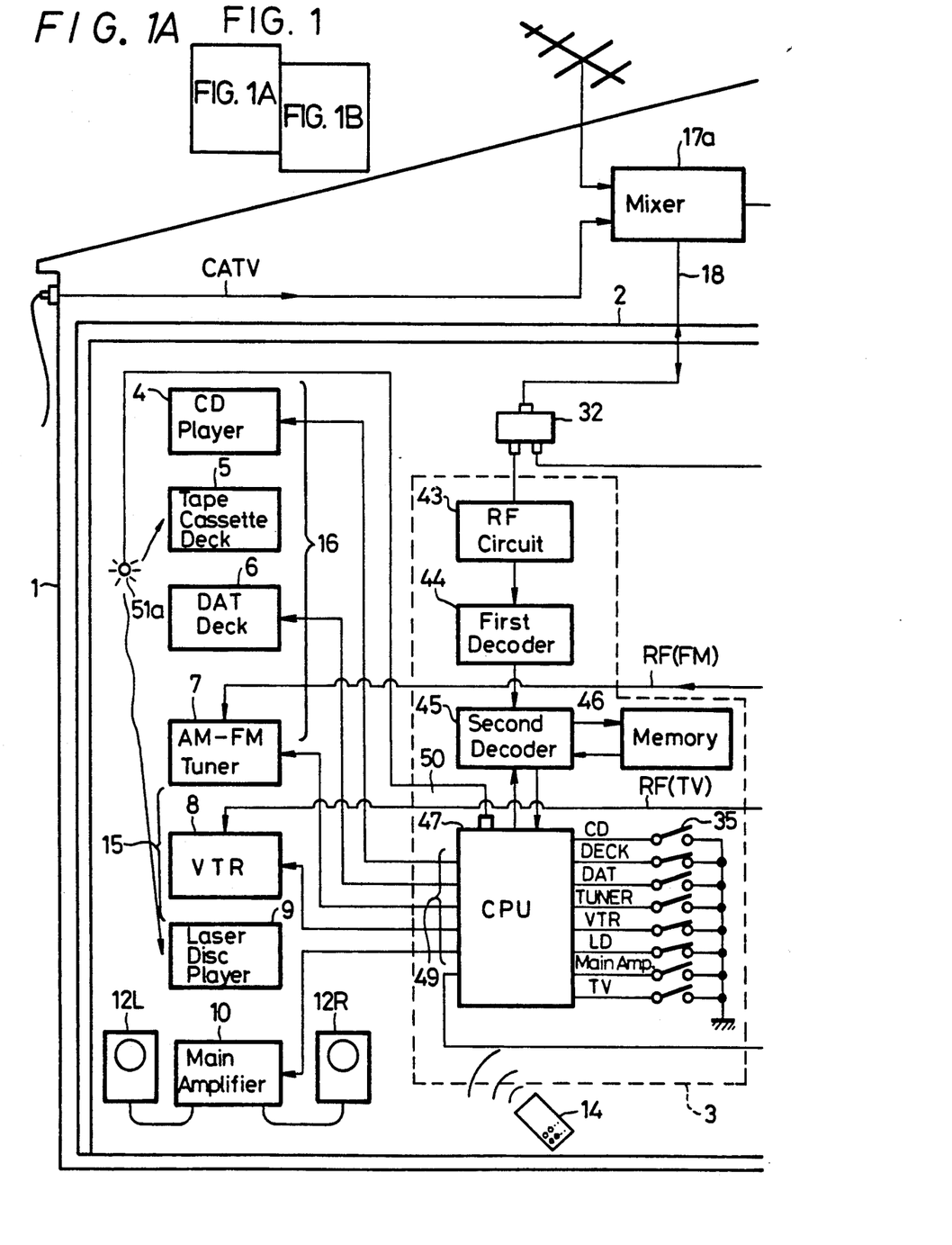
FIG. 1, 1A and 1B are a systematic block diagram showing a first embodiment of a signal transmission system according to the present invention.
Figure 1B:
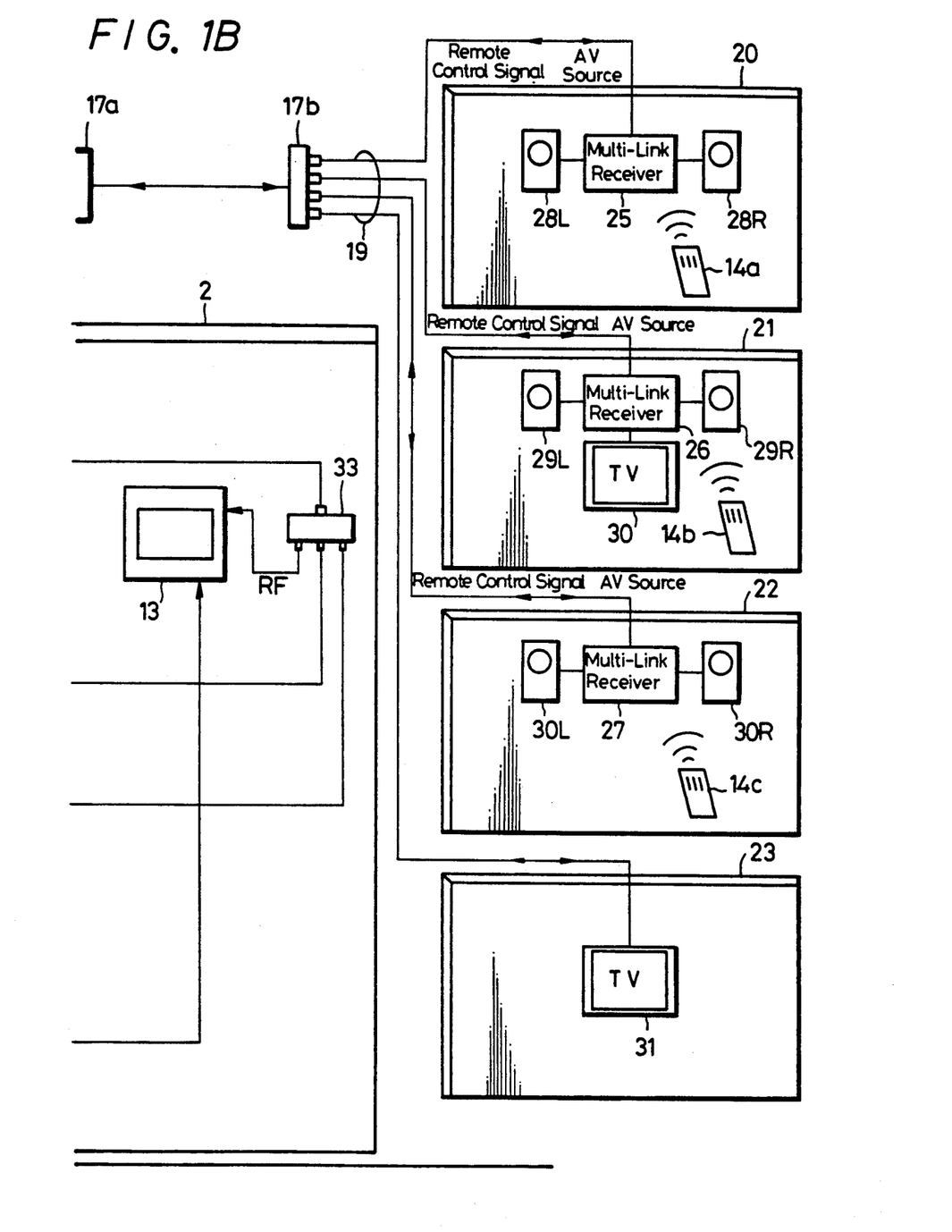

As shown in FIG. 1, of a plurality of rooms of a house 1, a basement or a parlor, for example, is used as a master room 2, and a multi-link center 3 such as a multi-preamplifier or the like is installed within this master room 2. A plurality of apparatus to be driven by this multi-link center 3, for example, a CD player 4, a tape cassette deck 5, a DAT (digital audio tape recorder) deck 6, an AM-FM tuner 7, a VTR 8, a laser disc player 9, a main amplifier 10 including left and right speakers 12L, 12R, a TV (television) receiver 13 and so on, are concentratedly installed in the master room 2. Even in the master room 2, desired audio information 16 and video information 15 from these plurality of apparatus can be viewed and listened to by the operation of a remote controller 14 or the like. The multi-link center 3 within this master room 2 is supplied with cable TV (CATV) information and so on through a mixer 17a and cable 18. The audio information 16 and the video information 15 from these plurality of concentratedly installed apparatus within the master room 2 are distributed through the mixer 17a, a distributor 17b and a cable 19 to a plurality of rooms 20, 21, 22 and 23 so that these informations can be selectively viewed and listened to in these rooms by remote controllers 14a to 14c. The rooms 20, 21 and 22 have multi-link receivers 25, 26 and 27 provided therein, respectively. The multi-link receiver 25 is provided with left and right speakers 28L and 28R. In the room 20, the audio information 16 from, for example, the CD player 4 or the like can be listened to, and in the room 21 the multi-link receiver 26, left and right speakers 29L and 29R, and a TV receiver 30 are installed so that the video information 15 from, for example, the VTR 8 can be viewed by the operation of the remote controller 14b. In the room 22, the audio information 16 from, for example, the DAT 6 can be listened to through the multi-link receiver 27 and left and right speakers 30L, 30R by the operation of the remote controller 14c. In the room 23, a TV receiver 31 is installed so that CATV can be viewed thereon.

The RF signals of CATV and so on from a two-output distributor 32 within the master room 2 are supplied to a three-output distributor 33, thereby distributed as, for example, the RF signal of the TV to the TV receiver 13 for CATV, the RF signal of FM to the tuner 7 and the RF signal of TV to the VTR 8.

A frequency allocation in the MLS of this embodiment upon reception of CATV signals as external signals will be described with reference to FIG. 2.

Figure 2:
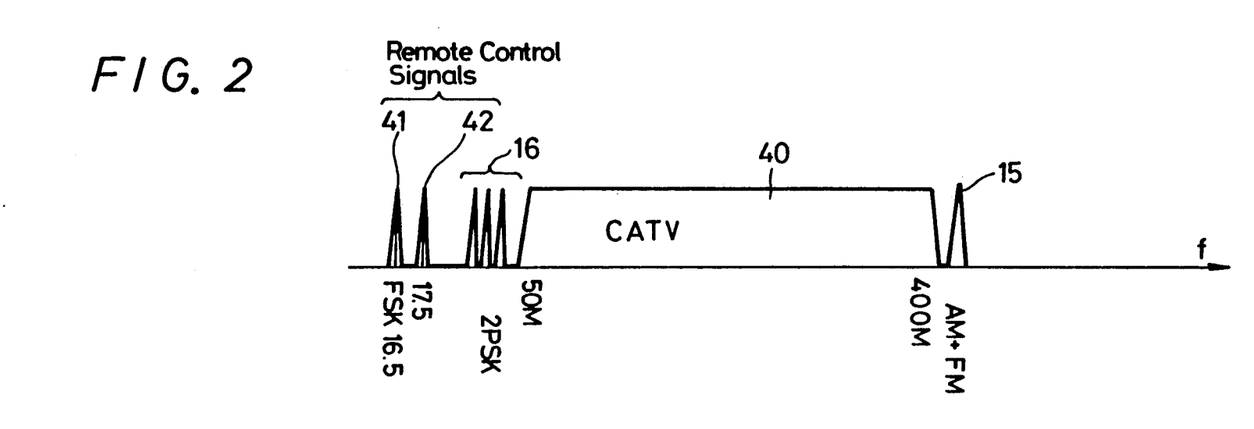
FIG. 2 is a diagram of frequency allocation of a multi-link system of the present invention.

In FIG. 2, reference numeral 40 represents a frequency band of 45 MHz to 370 MHz including, for example, channels 2 to 50 of frequency-modulated (FM) CATV. The AV (audio visual) informations to be used in the MLS of this embodiment are located above and below the CATV band. More specifically, the video information 15 is an analog signal which is AM and FM-modulated and located on the upper side of the CATV band, and the audio information 16 is digitized, two-phase modulated (i.e., 2PSK: phase shift keying), and located on the lower side of the CATV band. The audio information 16 and the video information 15 are both modulated in a frequency multiplex fashion. A first remote control signal 41 and a second remote control signal 42 for remote control are digitally frequency-modulated (FSK: frequency shift keying). The carrier frequency of the first remote control signal 41 is selected to be, for example, 16.5 MHz, and that of the second remote control signal 42 is selected to be 17.5 MHz. These remote control signals are modulated in a timebase multiplex fashion. The first remote control signal 41 is used to control from the master room 2, for example, the multi-link receivers 25, 26, 27 or the like in the respective rooms, and the second remote control signal 42 is used for the control from the remote controllers 14a to 14c of the respective rooms to the multi-link center 3 of the master room 2.

The remote control signal from the remote controller 14a to 14c might be a control signal of SIRCS (Sony Infrared Remote Control System) which the assignee of the present application creates and employs for the remote control of audio visual apparatus. The SIRCS remote control signal has a format of infrared digital code system and a code format thereof is represented in FIG. 3.

Figure 3:
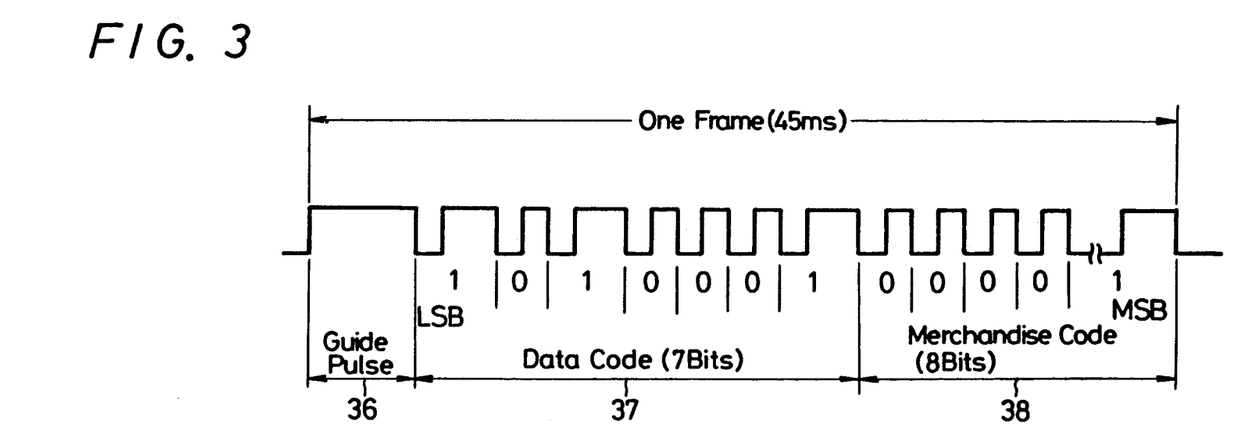
FIG. 3 is a diagram showing a format of a remote control signal of an infrared digital code system used in the present invention.

As shown in FIG. 3, the format of one frame (45 ms) is normally formed of 15 bits (or 12 bits) which includes a guide pulse 36 as an identification (ID) signal for specifying the start and a binary code of 15 bits (or 12 bits) which begins at 2 degrees following this guide pulse 36. This binary code is formed of a data code 37 of 7 bits indicative of control function, and a merchandise code 38 of 8 bits indicative of merchandise category, following this data code 37.

Figure 4A:
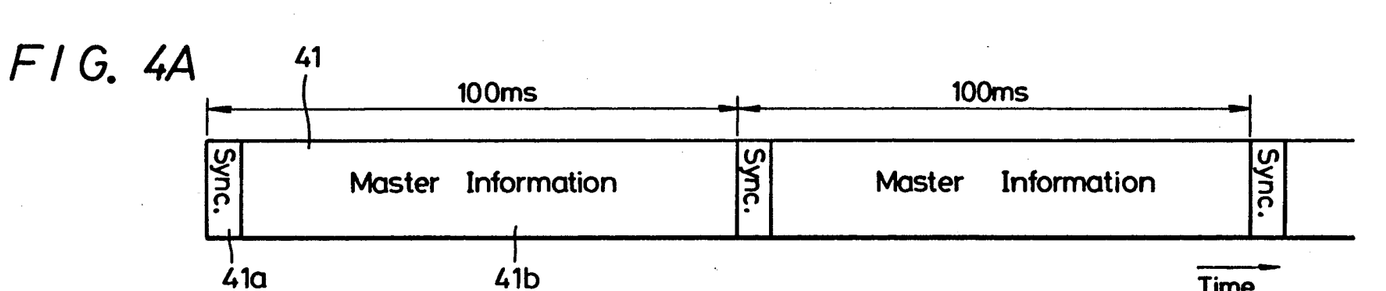
FIGS. 4A through 4C are diagrams of formats, respectively, of remote control signals of the multi-link system of the present invention.
Figures 4B, 4C:
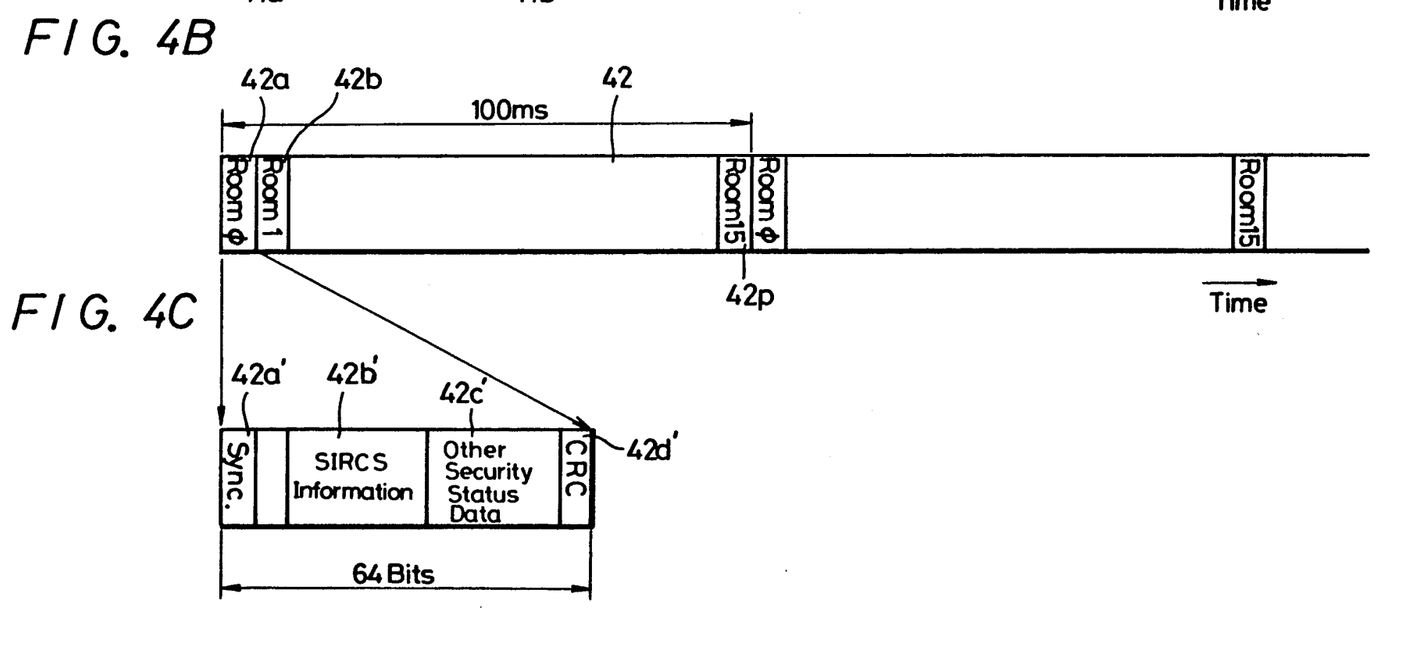

FIGS. 4A through 4C are format diagrams, respectively, of the first remote control signal 41 supplied from the multi-link center 3 to the multi-link receivers 25, 26 and 27 of the respective rooms, and the second remote control signal 42 supplied from the remote controllers 14a to 14c of the respective rooms to the multi-link center 3.

FIG. 4A shows the format of the first remote control signal, which is formed of at the head thereof a synchronizing (sync.) signal 41a and a next master information 41b such as data transmission room number and a transmission/reception permission flag or the like and which is repeatedly sent at every 100 ms of time. FIG. 4B shows the format of the second remote control signal 42, which is formed of control data 42a, 42b, . . . , 42p of 1024 bits for the first room to sixteenth room, and which is repeatedly sent at every 100 ms of time. The data of each room as shown in FIG. 4C is formed of a sync. signal 42a', data 42b' of 12 to 15 bits of the SIRCS system mentioned above, and other security status data 42c', and CRC (cyclic redundancy check) code 42d, in that order which have 64 bits in all and are timebase-compressed.

Figure 5:
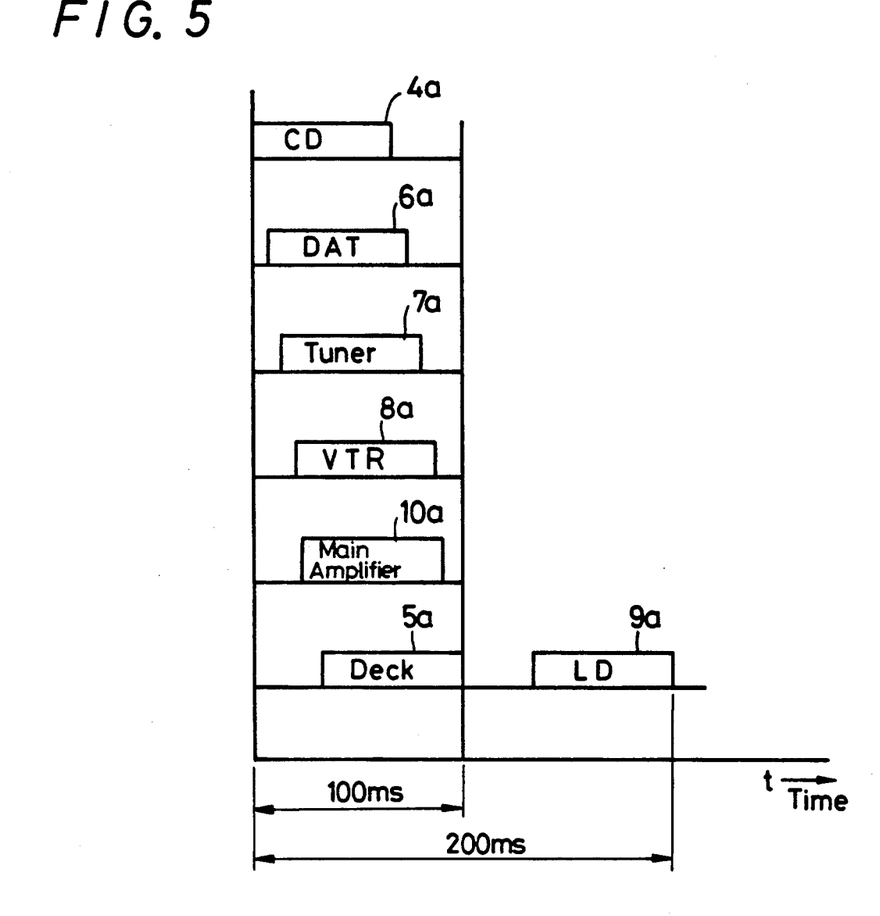
FIG. 5 is a schematic representation used to explain a serial parallel control system of the present invention.

Referring back to FIG. 1, the second remote control signal 42 from the remote controllers 14a to 14c and which is distributed by the two-output distributor 32 within the master room 2 has a carrier of 17.5 MHz and undergoes RF processing in an RF circuit 43. The thus processed signal is then supplied to the following first decoder 44, in which data of certain bits of the second 100-ms remote control signal 42 shown in FIG. 4B is decoded and from which decoded data is derived. The decoded signal is supplied to the following second decoder 45, which then produces data of 64 bits of one room unit as shown in FIG. 4C. The output of the second decoder 45 is supplied to a microcomputer (hereinafter referred to as a CPU (central processing unit)) 47. This CPU 47 is capable of simultaneously processing remote control signals 100-ms interval data of 16 rooms, and has a memory 46. This CPU 47 also arranges data read from the remote control signal of 64 bits at each room. If the CD player 4 and DAT 6 are found to be in the playback mode from the command state from the remote control signals 14a to 14c, then the CPU 47 raises flags on the table corresponding to the CD player 4 and the DAT 6 in the memory 46 and supplies control data with the flags raised, from parallel output terminals 49 of the CPU 47 to the CD player 4, the DAT 6, the tuner 7, the VTR 8, the main amplifier 10 and so on within 100 ms. This control data is the SIRCS signal of 45 ms per frame earlier noted with reference to FIG. 3. In order to increase reliability of operation more, control data of two frames used to process one command are supplied to a plurality of electronic apparatus such as the CD player 4, the DAT 6, the tuner 7, the VTR 8, the main amplifier 10 or the like in parallel substantially simultaneously so that control data can be supplied to the plurality of electronic apparatus during 100 ms of time, as shown in FIG. 5. If now the deck 5 and the laser disc player 9 other than the aforenoted electronic apparatus have no terminals to which the SIRCS control signal is supplied, the CPU 47 in this embodiment is provided with a series output terminal 50 for SIRCS from which the remote control signal is derived because the control data cannot be supplied from the SIRCS control data output terminals 49.

Since even the apparatus having no SIRCS terminal generally has a light receiving element for command, control data light-modulated is transmitted through the output terminal 50 from a light emitting element 51a, thus enabling the control data to be supplied to the deck 5 and the laser disc player 9 having no SIRCS terminal. In this case, since two apparatus are controlled in series as shown in FIG. 5, the controlling time of 200 ms is required, but the waiting time upon operation can be reduced by selecting two modes at a time.

In this embodiment, a switch group 35 by which the series or parallel state can be selected is provided on the CPU 47, and the electronic apparatus which is desired to be controlled in series is made in ground potential by closing its corresponding switch so that the control data can be delivered in series. Also, although in FIG. 1 it is not shown that the AV informations are delivered from the electronic apparatus 4 to 9, these informations are supplied in parallel from these apparatus 4 to 9 to the multi-link center 3.

Further, although the control data is supplied to the deck 5 and the laser disc player 9 having no SIRCS terminal from the common light emitting device 51a as described above, if for the apparatus having no SIRCS terminal there are provided exclusive light emitting elements respectively, the controlling time can be reduced more.

Figures 6, 6A:
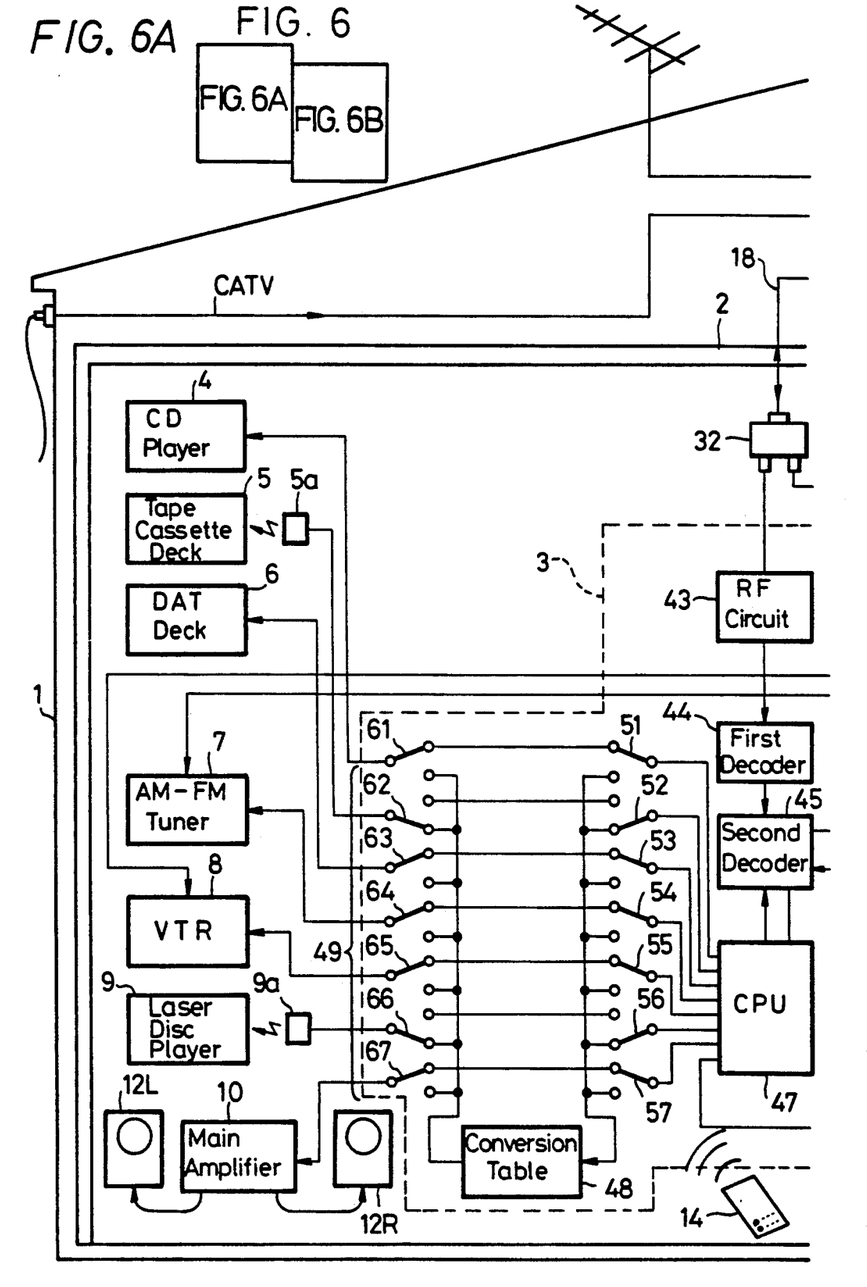
FIGS. 6, 6A, 6B are a systematic diagram showing a second embodiment of the signal transmission system according to the present invention.
Figure 6B:
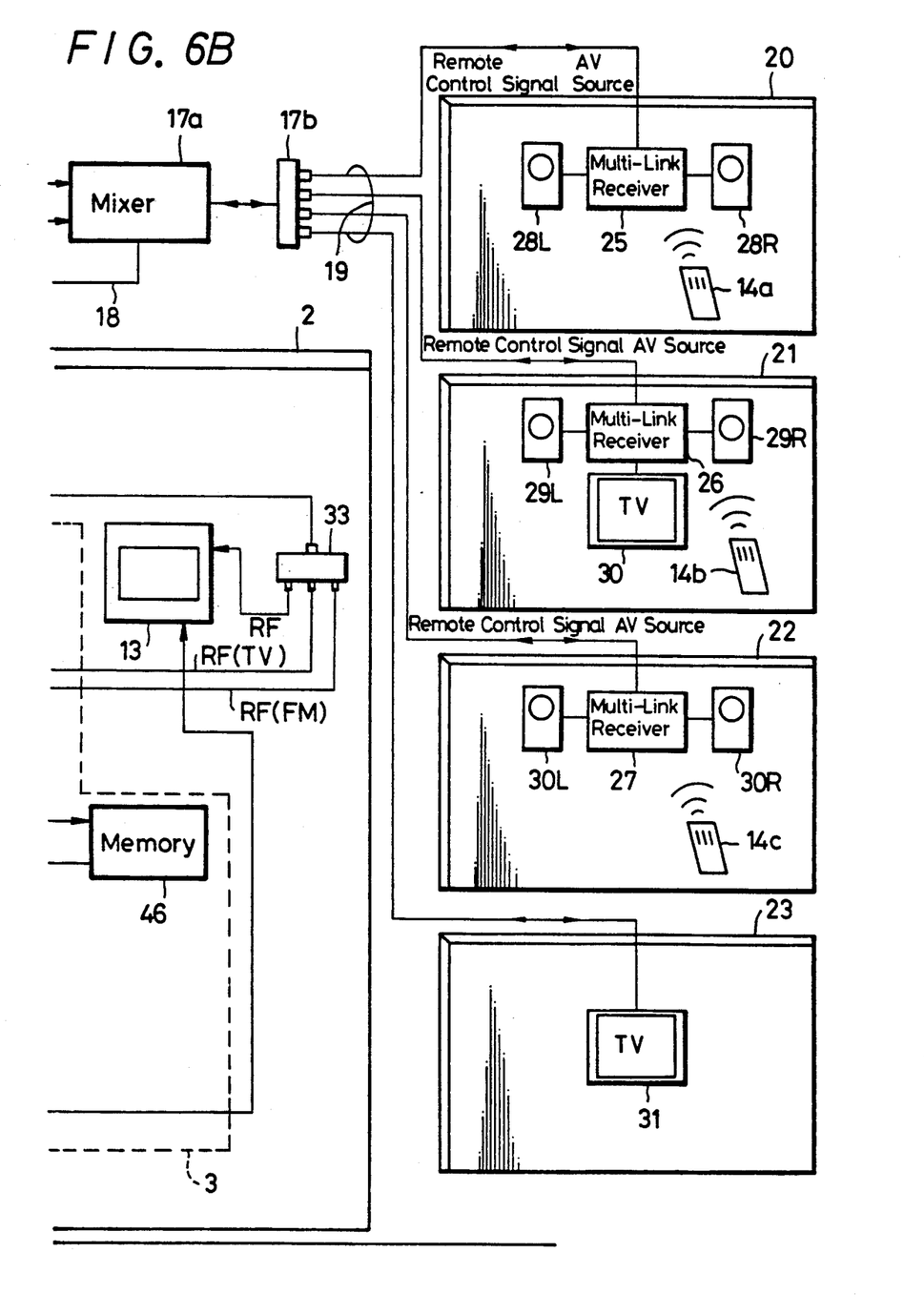

FIG. 6 shows a second embodiment of the present invention in which the controlling time can be reduced more. FIG. 6 is formed of FIGS. 6A and 6B drawn on two sheets of drawings so as to permit the use of a suitably large scale and in FIG. 6, like parts corresponding to those of FIG. 1 are marked with the same references and therefore need not be described in detail.

Referring to FIG. 6, the multi-link center 3 includes a conversion table 48 formed of a rewritable memory for the apparatus which cannot be operated by the SIRCS signal. The SIRCS signal is supplied to the conversion table 48, in which it is converted into control data stored therein by the operation which will be later referred to, and the thus converted control data is supplied to the corresponding apparatus.

More specifically, the control data produced separately for the respective apparatus from the CPU 47 are switched by change-over switches 51 to 57 to be distributed to the path including the conversion table 48 and to the path not including the conversion table 48. Then, the output from the conversion table 48 and the control data directly supplied from the switches 51 to 57 are switched to respective single signal lines by change-over switches 61 to 67 and then transmitted through the parallel output terminals 49 to the respective apparatus as control data. In this case, the change-over switches 51 to 57 and the change-over switches 61 to 67 are operated in unison with each other under the control of the CPU 47, so that the change-over switches associated with the apparatus which have made operation of storing the control data are changed to the conversion table 48 side position.

Let it now be assumed that of the apparatus connected to the multi-link center 3, the CD player 4, the DAT 6, the tuner 7, the VTR 8 and the main amplifier 10 are the apparatus of the same maker which can be operated by the SIRCS signal and that the deck 5 and the laser disc player 9 are the apparatus of different makers which have no SIRCS terminals and which can be operated by the remote control signal of control codes different from the SIRCS signal. At this time, the apparatus 4, 6, 7, 8, 10 which can be operated by the SIRCS signals are directly supplied at their SIRCS signal input terminals with the control signals (SIRCS signals) produced through the parallel output terminals 49. In the case of the apparatus 5, 9 which can be operated by the remote control signals of control codes different from the SIRCS signal, the control signals produced from the parallel output terminals 49 are supplied to infrared signal light emitting units 5a, 9a which are respectively oppose the respective infrared remote control signal receiving portions of the apparatus 5, 9 and the infrared signal light emitting units 5a, 9a supply infrared signals as control data to the signal receiving portions of the apparatus.

Figure 7:
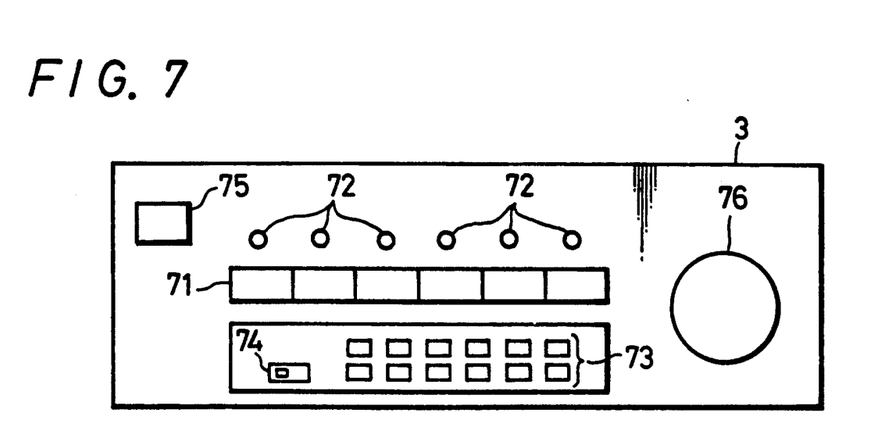
FIG. 7 is a schematic plan view of a front panel of a multi-link center used in the second embodiment of the present invention.

The procedure of storing the control data in this conversion table 48 will be described with reference to FIG. 7. FIG. 7 shows one example of the front panel of the multi-link center 3.

As FIG. 7 shows, this multi-link center 3 has provided thereon a panel function change-over switches 71 for selecting any one of the connected apparatus, pilot lamps 72 associated with the respective apparatus which can be switched by the function change-over switches 71, a plurality of operation switches 73, a mode change-over switch 74 and a remote control signal receiving portion 75. This multi-link center 3 also has a pre-amplifier function, its volume control 76 or the like.

When the control data is to be stored, the mode change-over switch 74 is first operated to select an operation mode of the multi-link center 3 as a learning mode. At this time, the pilot lamps 72 associated with the function by which the control codes other than the SIRCS signals are already stored in the conversion table 48 are lit, and the pilot lamps 72 associated with the function by which the control codes other than the SIRCS signal are not stored are intermittently lit.

Now assuming that no data of control codes other than the SIRCS signal is not stored at all, then the control data for the deck 5 and for the laser disc player 9 must be input. When the control data for the deck 5 is to be input, the user pushes the function change-over switch 71 associated with the deck 5. At this time, only the pilot lamp 72 associated with the deck 5 blinks. Then, after pushing any one of the operation keys 73 associated with the desired function to be stored, the user brings the remote controller (not shown) attached to the deck 5 and which derives a remote control signal other than the SIRCS signal close to the remote control signal receiving portion 75 and pushes the operation key of the same function of the remote controller, so that the remote controller of the deck 5 emits the corresponding remote control signal to the remote control signal receiving portion 75. The remote control signal received by the remote control signal receiving portion 75 is stored in the corresponding address of the conversion table 48 under the control of the CPU 47. In this case, when any one of the operation keys 73 is pushed, the blinking pilot lamp 72 is continuously turned on. When the operation of storing in the conversion table 48 is completed, the pilot lamp 72 is again blinked.

In this fashion, the control data for each function (PLAY, FAST FORWARD, REWIND, RECORD and so on) which the deck 5 has are stored in the conversion table 48.

Moreover, similarly when the control data for the laser disc player 9 is to be inputted, the function change-over switch 71 associated with the laser disc player 9 is pushed and then the operation key 73 and the remote controller of the laser disc player 9 are operated. After the completion of the control data storing operation, the mode change-over switch 74 is operated to bring the operation mode of the multi-link center 3 back to the normal mode.

When the data of the control code other than the SIRCS signal have been stored in the conversion table 48, the control codes t be supplied from the CPU 47 to the apparatus (the deck 5 and the laser disc player 9) are controlled by the switching operation of the change-over switches 51 to 57 and change-over switches 61 to 67 so as to be fed through the conversion table 48 to the parallel output terminals 49. When the SIRCS signal is supplied to the conversion table 48, the stored control data of other codes of the same function is read from the conversion table 48, and supplied through the parallel output terminals 49.

Thus, when the control data of SIRCS signal is generated from the remote controller 14 within the master room 2, and when the control data of SIRCS signal are generated from the remote controllers 14a to 14c within the respective rooms 20, 21, 22, 23 and fed through the above-mentioned transmission paths to the multi-link center 3, the control data of SIRCS signal are directly supplied to the apparatus (the CD player 4, the DAT 6, the tuner 7, the VTR 8 and the main amplifier 10) which can be operated by the SIRCS signal, and the corresponding control data read from the conversion table 48 are fed to the apparatus (the deck 5 and the laser disc player 9) which can be operated by other control codes, so that the respective apparatus can be controlled by the MLS irrespective of the kinds of the control codes.

Since the signal transmission system of the present invention is constructed as described above, the control signal can be processed during a reduced time. Furthermore, even when the apparatus operable by the remote control signal of control code other than the SIRCS signal is installed within the master room, such remote control signal is converted into a remote control signal associated with the apparatus, thus making it possible to control apparatus having different control codes.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A signal transmission system in which a plurality of electronic apparatuses which transmit audio and/or video information are concentratedly installed and in which said audio and/or video information from said electronic apparatuses are viewed and listened to in a plurality of remote spots, comprising:
    (1) first control means connected with said plurality of electronic apparatuses and having means for supplying a first control signal in parallel or in series to each of said electronic apparatuses so that said electronic apparatuses are controlled by their respective first control signal;
    (2) second control means for receiving said audio and/or video information through said first control means from said plurality of said electronic apparatuses and transmitting a second control signal for controlling said first control means so that said first control means supplies said first control signal to a respective electronic apparatus of said electronic apparatuses;
    (3) transmitting means for connecting said first control means and said second control means, for transmitting the audio and/or video information from said first control means to said second control means and for transmitting said second control signal for controlling said first control means from said second control means to said first control means; and
    (4) converting means, provided in said first control means, for converting said second control signal from said second control means to said first control signal and for supplying said first control signal to said respective electronic apparatus in parallel or in series corresponding with said respective electronic apparatus that is being supplied with said first control signal;
    wherein said converting means includes memory means for storing said first control signal that is associated with said second control signal and switching means controlled by a central processing unit (CPU) for selectively switching said first control signal, said first control signal that is associated with said second control signal either is converted through said memory means to a format different from said second control signal prior to being supplied to said respective electronic apparatus or is directly connected to said respective electronic apparatus.

2. A signal transmission system according to claim 1, wherein said switching means selectively switches said second control signal so that said first control signal is supplied in parallel or in series to said respective electronic apparatus depending upon the particular type of said respective electronic apparatus that is connected to said first control means.

3. A signal transmission system according to claim 1, wherein at least said first control signal converted by said converting means is light-modulated and transmitted to said respective electronic apparatus.

4. A signal transmission system according to claim 1, wherein said second control signal is modulated in a first data format and said first control signal is converted from said first data format into a converted data format that is specified by said respective electronic apparatus.

5. A signal transmission system according to claim 1, wherein when said first control signal is transmitted in parallel, said first control means transmits said first control signal to said respective electronic apparatus over a transmission path separate from transmission paths over which first control signals for other electronic apparatuses are transmitted.

6. A signal transmission system according to claim 1, wherein when said first control signal is transmitted in serial, said first control signal for said respective electronic apparatus and first control signals for other electronic apparatuses are transmitted together over a single transmission path.

7. A signal transmission system according to claim 6, wherein said single transmission path comprises an optical transmission path.

* * * * *